United States Patent Office 3,676,168
Patented July 11, 1972

3,676,168
CARBON BLACK MANUFACTURE
Robert E. Dollinger, Toledo, Ohio, assignor to
Phillips Petroleum Company
No Drawing. Filed May 14, 1970, Ser. No. 37,338
Int. Cl. C08h 17/08; C09c 1/58
U.S. Cl. 106—307                    10 Claims

ABSTRACT OF THE DISCLOSURE

A method of improving the scorch time of rubber into which carbon black is blended by incorporating into the carbon black an antioxidant by mixing the antioxidant and carbon black in contact with water and oxidatively drying the carbon black.

---

This invention pertains to carbon black manufacture.

In one of its more specific aspects, this invention relates to the production of carbon black which imparts improved properties to the rubber into which it is blended.

In the compounding of rubber comprising any of the commercially available carbon blacks, it is conventional to compose the rubber blend of various materials including the rubber component, stearic acid, sulfur, zinc oxide and various other components which act to impart to the finished rubber long scorch time. The components which affect this property are individually added to the rubber blend as is the carbon black which, as a matter of convenience in handling, is usually added in pelleted form.

Principal among the agents which affect scorch time are antioxidants. It has now been discovered that the effectiveness of such antioxidants is enhanced if these antioxidants are added to the rubber in combination with the carbon black.

According to the method of this invention, rubber of improved properties is produced by incorporating into it carbon black which has been contacted with an antioxidant in an aqueous medium, the wet carbon black being dried as hereinafter defined.

Accordingly, it is an object of this invention to produce a carbon black imparting improved scorch time to rubber.

It is also an object of this invention to simplify the procedure for preparing rubbers.

Other objects of this invention will be evident from the following disclosure.

The method of this invention is applicable to all commercially-produced carbon blacks incorporable in rubber.

While the carbon black comprising the antioxidants concerned is preferably pelleted, it is not necessary that the carbon black be pelleted. It is within the scope of this invention to incorporate the antioxidants with the carbon black and to dry the black as hereinafter defined without pelleting the black. Similarly, the method of this invention is applicable to all rubbers into which carbon blacks are conventionally incorporated and is also applicable to all suitable methods of associating the antioxidants with the carbon black, these including mixing, blending pelleting, and the like.

This invention is particularly directed towards the use of antioxidants comprising para-substituted-2,6-di - tert-butylphenols, i.e., 4-substituted-2,6-di-tert - butylphenols, and which have the general formula

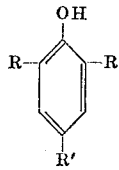

in which R is a tertiary butyl radical and in which R' is one of (a) 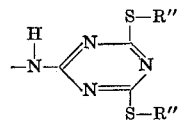

wherein R" is an alkyl radical having from about 6 to about 24 carbon atoms;

(b) 
$$-(CH_2)_2-\overset{O}{\underset{\|}{C}}-O-R''$$

wherein R" is an alkyl radical having from about 6 to about 24 carbon atoms; and, (c) 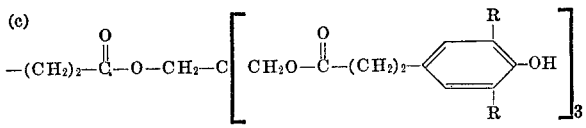

wherein R is a tertiary butyl radical.

Among such compounds are 2-(4-hydroxy-3,5-di-t-butylanilino)-4,6-bis-(n-octylthio)-1,3,5-triazine; tetrakis-[3-(3,5-di-t-butyl - 4 - hydroxyphenyl) - propionyloxymethyl]-methane; and octadecyl-3-(3,5-di-t-butyl-4 - hydroxyphenyl)-propionate. These compounds are commercially available from, for example, the Geigy Chemical, Ardsley, N.Y., under trade names of Irganox 565, Irganox 1010, and Irganox 1076.

Irganox 565 is 2-(4-hydroxy-3,5-di-t-butylanilino)-4,6-bis-(n-octylthio)-1,3,5-triazine. In its commercial form it is a white powder having a melting point of 94–97° C.

Irganox 1010 is a tetrakis-[3-(3,5-di-t-butyl-4-hydroxyphenyl)-propionyloxymethyl] - methane, also known as tetra-[methylene-3-(3,5-di-t-butyl - 4 - hydroxyphenyl)-propionate]-methane, being a powder having a melting point of about 120° C.

Irganox 1076 is octadecyl-3-(3,5-di-t-butyl-4-hydroxyphenyl)-propionate and is a powder having a melting point of 48–53° C.

The antioxidant is incorporated in the black in any suitable manner. If the black is produced in the form of pellets, the black is pelleted in contact with water under pelleting conditions. The antioxidant is incorporated by either introduction into the black, or into the water or by addition to the carbon black-water mixture. Other pelleting aids such as molasses and the like, conventionally employed, can also be used to facilitate the pelleting.

If the black is produced in the form of an unpelleted, flocculent mass, the mixing step will be comparable to that employed in pelleting except that pelleting will be avoided. Thereafter, the wet carbon black having the antioxidant incorporated therein will be drained of excess liquid and dried as hereinafter defined.

The antioxidants can be incorporated in the black either individually or as a mixture. In either instance, the antioxidant can be incorporated in the black, in any method of addition thereto, so that the antioxidant is added to the substantially dry carbon black in an amount from about 0.05 to about 5 weight percent.

After incorporation of the antioxidant in the carbon black, the carbon black, whether flocculent or pelleted, is dried in suitable drying equipment at a temperature from about 350 to about 600° F., preferably from about 450° F. to about 550° F., for a period of about 1 to about 45 minutes, preferably from about 25 to about 35 minutes. The black is dried under oxidative conditions, that is, the black is oxidatively dried by contacting it during the drying procedure, at the defined temperature, with free oxygen-containing gas such as air and preferably during the entire drying period, as is conventional in the art.

The method of this invention is illustrated in the series of runs summarized in Table I, below.

The carbon black employed was produced in a conventional carbon black furnace from a hydrocarbon feedstock. It was pelleted in the presence of water.

An ASTM Natural Rubber recipe was employed as the base into which the carbon black, having the various antioxidants incorporated, were blended. This recipe was as follows:

| Component: | Parts by weight |
|---|---|
| Liberian crepe | 100 |
| Zinc oxide | 5 |
| Stearic acid | 3 |
| Sulfur | 2.5 |
| Altax | 0.6 |
| Carbon black | 50.0 |

(Altax is benzothiazyl disulfide, that is, 2,2'-dibenzothiazyl disulfide.)

In each run, the black, pelleted as described and having incorporated in it in the antioxidant indicated, was incorporated in the rubber recipe by conventional methods.

Runs 1 and 2 were control runs in which no antioxidant was incorporated in the black.

Runs 3, 4, 5, 6 and 7 were runs in each of which Irganox 1010 was incorporated in the black in different amounts, the black being oxidatively dried under different conditions.

Runs 8 and 9 were runs in which Irganox 1076 and Irganox 565 were individually incorporated in blacks which were then oxidatively dried.

Results were as follows:

prising a para-substituted-2,6-di-tert-butylphenol having the general formula:

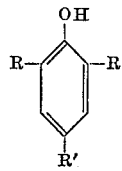

in which R is a tertiary butyl radical, and in which R' is one of (a)

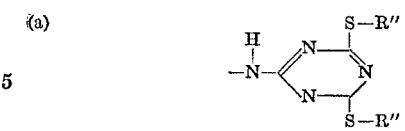

in which R'' is an alkyl radical having from about 6 to about 24 carbon atoms;

(b)

$$-(CH_2)_2-\overset{O}{\underset{\|}{C}}-O-R''$$

in which R'' is an alkyl radical having from about 6 to about 24 carbon atoms; and, (c)

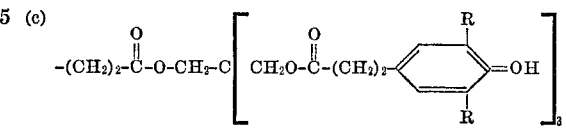

in which R is a tertiary butyl radical.

2. The method of claim 1 in which said antioxidant comprises one of 2(4-hydroxy-3,5-di-t-butyl-anilino)-4,6-

TABLE I

| | Run No. | | | | | | | | |
|---|---|---|---|---|---|---|---|---|---|
| | 1 | 2 | 3 | 4 | 5 | 6 | 7 | 8 | 9 |
| Additive | None | None | [1]1010 | [1]1010 | [1]1010 | [1]1010 | [1]1010 | [1]1076 | [1]565 |
| Additive, wt. percent of carbon black | 0 | 0 | 0.1 | 0.1 | 0.1 | 0.3 | 1.0 | 0.3 | 0.3 |
| Pelleting water, wt. percent of carbon black | 52 | 52 | 52 | 52 | 52 | 52 | 52 | 52 | 52 |
| Drying conditions: | | | | | | | | | |
| Maximum temp., °F | 405 | 400 | 350 | 500 | 500 | 500 | 500 | 500 | 500 |
| Time at max. temp., °F., minutes | 1 | 1 | 1 | 1 | 30 | 30 | 30 | 30 | 30 |
| Properties of carbon black: | | | | | | | | | |
| Surface area, m.²/gm | 104 | 101 | 103 | 104 | 107 | 106 | 101 | | |
| Structure, cc./100 gm | 76 | 72 | 77 | 76 | 76 | 77 | 77 | | |
| Properties of rubber recipe: Scorch at 250° F., min | 13.2 | 11.9 | 12.6 | 15.7 | 17.0 | 17.5 | 17.8 | 17.9 | 16.4 |

[1] Irganox compound.

The above data indicate the operability of the method of this invention and its effectiveness.

Runs 3 and 4 indicate that an improvement in scorch time results upon addition of very small quantities of the antioxidant in accordance with this invention.

Runs 4 and 5 indicate an improvement with increased drying temperature and time under otherwise comparable conditions.

Runs 6 and 7 indicate an improvement with increased quantities of the antioxidant.

It is apparent from the above data that the scorch time can be adjusted by the length of the drying time and by the temperature at which the drying is conducted.

It will be evident from the foregoing that various modifications can be made to the method of this invention. Such, however, are considered to be within the scope of this invention.

What is claimed is:

1. A method of producing a carbon black imparting improved scorch time to the rubber into which the carbon black is incorporated which comprises mixing carbon black and an antioxidant in contact with water and oxidatively drying said carbon black, said antioxidant combis(n-octylthio)-1,3,5-triazine; tetrakis-[3-(3,5-di-t-butyl-4-hydroxyphenyl)propionyloxymethyl]-methane; and octadecyl-3(3,5-di-t-butyl-4-hydroxyphenyl)propionate.

3. The method of claim 2 in which said carbon black is pelleted during said contact and said pellets are dried at a temperature from about 350° to about 600° F. for a period of from about 1 to about 45 minutes.

4. The method of claim 2 in which the antioxidant is present in an amount from about 0.05 to about 5 weight percent of said black.

5. The method of claim 2 in which said black is dried in contact with a free oxygen-containing gas.

6. Carbon black comprising a para-substituted-2,6-di-tert-butylphenol having the general formula:

in which R is a tertiary butyl radical, and in which R' is one of (a) 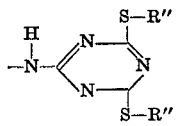

in which R" is an alkyl radical having from about 6 to about 24 carbon atoms;

(b) 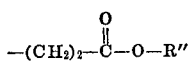

in which R" is an alkyl radical having from about 6 to about 24 carbon atoms; and, (c) 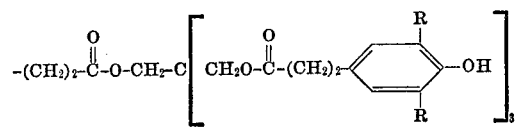

in which R is a tertiary butyl radical.

7. The method of claim 1 in which said carbon black, said water and said antioxidant are brought into contact by the pelleting of said black.

8. The carbon black of claim 6 in which said antioxidant is present in an amount within the range of from about 0.05 to about 5 weight percent of said black.

9. The carbon black of claim 8 which comprises molasses.

10. The carbon black of claim 9 in which said antioxidant is selected from the group consisting of 2(4-hydroxy-3,5-di-t-butylanilino)-4,6-bis(n-octylthio)-1,3,5 - triazine, tetra[methylene-3-(3,5-di-t-butyl-4-hydroxyphenyl)propionate]methane, and octadecyl-3-(3,5-di-t-butyl-4-hydroxyphenyl)propionate.

References Cited
UNITED STATES PATENTS

| | | | |
|---|---|---|---|
| 2,867,540 | 1/1959 | Harris | 106—307 |
| 3,323,932 | 6/1967 | Aboytes et al. | 106—307 |
| 3,462,375 | 8/1969 | Braus et al. | 252—404 |
| 3,480,581 | 11/1969 | Braus et al. | 252—404 |

JAMES E. POER, Primary Examiner

UNITED STATES PATENT OFFICE
CERTIFICATE OF CORRECTION

Patent No. 3,676,168                Dated: July 11, 1972

Robert E. Dollinger

It is certified that error appears in the above-identified patent and that said Letters Patent are hereby corrected as shown below:

Column 4, line 27, that part of the formula reading 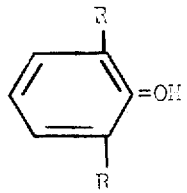 should read 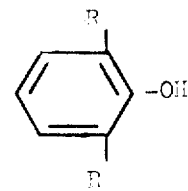

Signed and sealed this 2nd day of January 1973.

(SEAL)
Attest:

EDWARD M. FLETCHER, JR.
Attesting Officer

ROBERT GOTTSCHALK
Commissioner of Patents